United States Patent
Hoshi et al.

(10) Patent No.: US 9,878,640 B2
(45) Date of Patent: Jan. 30, 2018

(54) VEHICLE SEAT AND METHOD FOR MANUFACTURING SAME

(75) Inventors: Masayuki Hoshi, Tochigi (JP); Hiroyuki Itoi, Tochigi (JP); Takahiro Niimura, Tochigi (JP)

(73) Assignee: TS Tech Co., Ltd., Saitama (JP)

( * ) Notice: Subject to any disclaimer, the term of this patent is extended or adjusted under 35 U.S.C. 154(b) by 232 days.

(21) Appl. No.: 14/427,214

(22) PCT Filed: Sep. 12, 2012

(86) PCT No.: PCT/JP2012/073364
§ 371 (c)(1),
(2), (4) Date: Mar. 24, 2015

(87) PCT Pub. No.: WO2014/041643
PCT Pub. Date: Mar. 20, 2014

(65) Prior Publication Data
US 2015/0239370 A1    Aug. 27, 2015

(51) Int. Cl.
*B60N 2/16*    (2006.01)
*B60N 2/68*    (2006.01)
*B23K 26/20*   (2014.01)

(52) U.S. Cl.
CPC ............ *B60N 2/1615* (2013.01); *B23K 26/20* (2013.01); *B60N 2/682* (2013.01)

(58) Field of Classification Search
CPC ....... B60N 2/1615; B60N 2/682; B23K 26/20
(Continued)

(56) References Cited

U.S. PATENT DOCUMENTS 7,278,686 B2 * 10/2007 Yoshida ................. B60N 2/165
                                                    248/421 X
2004/0201264 A1 * 10/2004 Hofmann ............... B60N 2/002
                                                    297/344.1
(Continued)

FOREIGN PATENT DOCUMENTS

JP    57-134289 A    8/1982
JP    06-133829 A    5/1994
(Continued)

OTHER PUBLICATIONS

Office Action issued in related application JP 2012-259385, Aug. 23, 2016, with machine generated English language translation, 7 pages.
(Continued)

*Primary Examiner* — Anthony D Barfield
(74) *Attorney, Agent, or Firm* — Drinker Biddle & Reath LLP

(57) ABSTRACT

A vehicle seat includes a link mechanism for liftably connecting a seat cushion to a support base directly or indirectly mounted to a vehicle body. The seat cushion is composed of a seating frame with side frames arranged at both right and left ends. The link mechanism includes link members connecting the support base and side frames, and a link connecting member connecting the link members together. Flange portions are formed at both end portions of the extending direction of the link connecting member. End surfaces of the extending direction of the flange portions and facing surfaces of the link members facing the end surfaces are abutted, and the end surfaces and the facing surfaces are joined by welding.

12 Claims, 13 Drawing Sheets

(58) Field of Classification Search
USPC .................................... 297/344.15; 248/421
See application file for complete search history.

(56) References Cited

U.S. PATENT DOCUMENTS

| | | |
|---|---|---|
| 2006/0001304 A1 | 1/2006 | Walker et al. |
| 2015/0246624 A1* | 9/2015 | Furuta .................... B60N 2/72 |
| | | 297/344.15 |

FOREIGN PATENT DOCUMENTS

| | | |
|---|---|---|
| JP | 09-010067 A | 1/1997 |
| JP | 3497923 B2 | 2/2004 |
| JP | 2004-167070 A | 6/2004 |
| JP | 2006-006957 A | 1/2006 |
| JP | 2008-260324 A | 10/2008 |
| JP | 3162435 U | 9/2010 |
| JP | 2011-178369 A | 9/2011 |
| JP | 2012-502851 A | 2/2012 |
| JP | 2012-131451 A | 7/2012 |

OTHER PUBLICATIONS

Office Action issued in related application JP 2014-535289, dated Jun. 28, 2016, with machine generated English language translation, 7 pages.

* cited by examiner

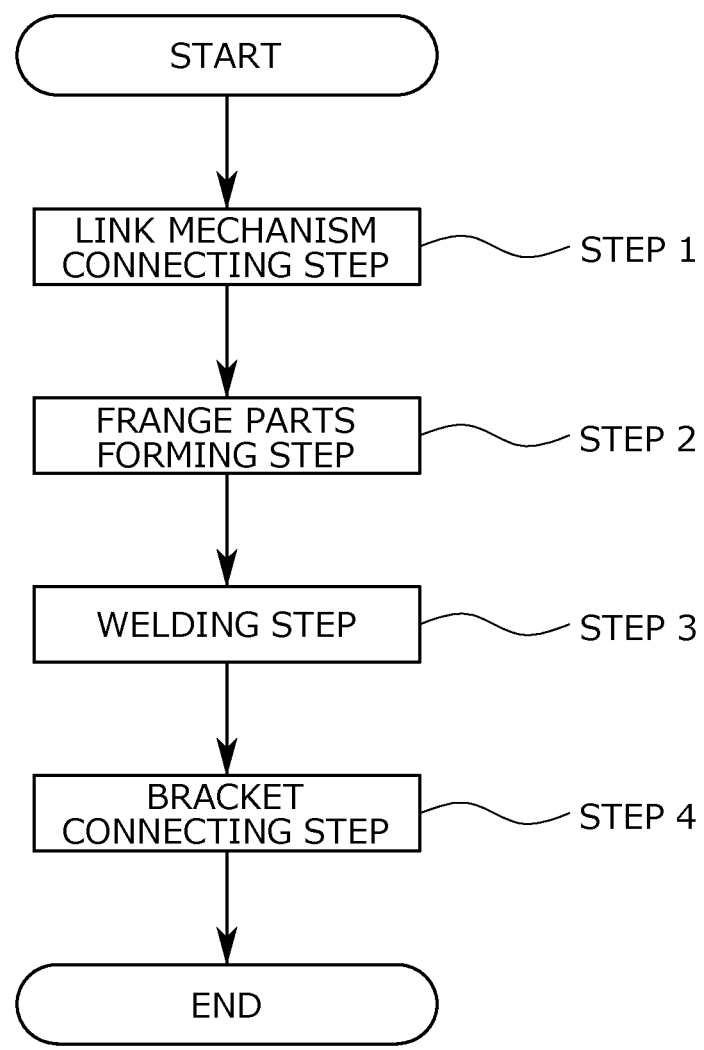

VEHICLE SEAT AND METHOD FOR MANUFACTURING SAME

CROSS REFERENCE TO RELATED APPLICATIONS

This application is a National Stage Entry application of PCT Application No. PCT/JP2012/073364, filed Sep. 12, 2012.

BACKGROUND

Disclosed herein is a vehicle seat and a method for manufacturing the same, and particularly, a vehicle seat and a method for manufacturing the same capable of suppressing an increase in size.

In general, a vehicle seat is configured to be capable of displacing a seat surface position thereof.

For example, in consideration of the physiques of occupants being individually different, a lot of vehicle seats are known to include a height adjustment mechanism to be able to adjust the height of the vehicle seat depending on the physique of the occupant with the aim of improving drivability or the like in a driver seat and ensuring comfort or the like in other seats.

As these height adjustment mechanisms, link mechanisms are often adopted.

That is to say, in a seat cushion frame becoming a frame of the seat surface of the vehicle seat, the frame of the right and left direction is formed by arranging a pair of side frames on the right and left thereof.

Then, the link mechanisms are structured by using link members or the like to both the right and left side frames, and by connecting the links on the both sides by way of connecting members at the rear side and the front side of the vehicle, the link mechanisms on the both right and left sides are interlocked.

In this manner, by interlocking the both right and left side frames, the seat cushion frame is moved up and down.

When such mechanisms (the link mechanisms) are structured and the vehicle seat (the seat cushion frame) is moved up and down, the structured link mechanisms has to be connected to the both right and left side frames as described above.

That is to say, the need to connect the link members arranged on the both right and left side frames by the connecting members arises.

Therefore, a method for connecting these connecting members to the link members arranged on the both right and left side frames is proposed (for example, see Patent Registration No. 3497923 B ("the '923 Document").

In the technique described in the '923 Document, a seat lifter is disclosed.

The seat lifter moves a seat frame up and down by way of the link mechanisms.

One end portion of a lifter shaft connecting the right and left sides of the seat frame is connected to a sector gear constituting the link mechanism.

On the lifter shaft formed by a pipe, an enlarged diameter portion is formed at a predetermined position by bulging, and after pressing the sector gear into the lifter shaft from the end portion thereof, both are joined by welding at the enlarged diameter portion side.

However, if it is thus configured by forming a hole in a link mechanism constituting member and pressing the end portion of the shaft into the hole (that is, by passing the end portion of the shaft through the link mechanism constituting member and fixing it thereto), the end portion of the connecting member (the shaft) projects to the opposite side.

As thus described, if the end portion of the connecting member (the shaft) projects to the opposite side, the end portion was likely to obstruct the arrangement of other constituting members.

Moreover, a projecting portion, a component for avoiding interference between a projection portion and other members, and a device itself are increased in size.

Further, in a case where link connecting members are arranged on the side frames constituting a seating frame (the seat frame), the end portion of the shaft hinders the arrangement, so that a configuration for absorbing the projecting portion is required.

For example, there were needs of forming projection holes or of forming concave portions for putting the end portion of the connecting member (the shaft) therein, in the side frames, but this increased cost and man-hours.

Therefore, the development of a mounting structure of a connecting member (a shaft) for avoiding interference of side frames and members around the side frames and avoiding an increase in the size of a device, and the development of a vehicle seat with the same were strongly desired.

SUMMARY

Thus, various embodiments of the invention consider the above problem, and an object of these embodiments is to provide a vehicle seat and a method for manufacturing the same capable of avoiding interference with respective portions arranged around a seat frame and suppressing an increase in the size of the seat, and also achieving an efficient and high-rigidity joint between connecting members and members constituting a height adjustment mechanism.

In accordance with a vehicle seat according to an embodiment of the present invention, the above problem is solved by the vehicle seat including a link mechanism for liftably connecting a seat cushion to a support base directly or indirectly mounted to a vehicle body, in which the seat cushion is composed of a seating frame with side frames arranged at both right and left ends; the link mechanism includes link members connecting the support base and the side frames, and a link connecting member connecting the link members together; flange portions are formed at both end portions of the extending direction of the link connecting member; end surfaces of the extending direction of the flange portions and facing surfaces of the link members facing the end surfaces are abutted; and the end surfaces and the facing surfaces are joined by welding.

In this way, the flange portions are formed on the end surface of the link connecting member, and welding is performed by abutting the end surfaces of the flange portions and the facing surfaces of the link members.

Hence, welding can be performed by efficiently abutting the end surfaces of the flange portions and the facing surfaces of the link members.

Then, in this way, the link members are mounted to the link connecting member by welding and fixing the flange portions formed at the both end portions of the link connecting member which is arranged between the link members to bridge them so that the end portions of the link connecting member do not project to the outside (the opposite side of the side where the link connecting member is arranged) of the link members.

In the conventional art, the link connecting member and the link members are fixed in a state that the end portions of the link connecting member are passed through through-holes formed in the link members so that the end portions of the link connecting member projected to the outside (the opposite side of the side where the link connecting member is arranged) of the link members.

However, the flange portions and the link members are welded at the inside of the link members so that a projection end of the link connecting member at the outside like the conventional art does not exist.

Therefore, inconveniences such as interference of other members and the projection end of the link connecting member can be effectively avoided, and a device does not need to be increased in size in order to avoid interference thereof.

That is to say, since there is no need for interference avoidance, the device can be reduced in size compared to the conventional one.

Moreover, welding is performed by abutting the end surfaces of the flange portions and the facing surfaces of the link members so that connection rigidity of the link members and the link connecting member is improved.

Further, in the above vehicle seat, as in an embodiment, it is preferable that the flange portion has a notch formed by notching at least a portion of an outer edge portion thereof.

As a specific configuration, as in an embodiment, it is preferable that the outer edge at a position matched to a corner of the facing surface of the link member, of the end surface of the flange portion, is notched into a shape along the outer edge of the corner.

As thus configured, a protruding portion of the link member from the outer edge is eliminated, and interference between the other members and the flange portions can be effectively suppressed, thereby contributing to a reduction in the size of the device.

Moreover, in the above vehicle seat, as in an embodiment, it is preferable that the link connecting member is configured to have a hollow bore extending to the end surface of the flange portion, and on the facing surface of the link member, the convex portion projecting to the flange portion side is formed, and that the hollow bore and the convex portion are matched.

As thus configured, positioning of the link connecting member is facilitated, and workability is improved.

Moreover, misalignment of the link connecting member on the link members can be effectively suppressed, and workability is improved.

"Matching" widely refers to a state that positions are aligned and is a concept including "fitting", "engagement", "loosely fitting" and the like.

That is to say, states other than a state of being completely fitted in are widely included as long as at least positioning is possible.

By a fitting and engagement configuration, support during work can be eliminated or facilitated so that workability is improved when a joint work by welding is performed.

Moreover, in the above vehicle seat, as in an embodiment, it is preferable that the end surfaces and the facing surfaces are joined by laser-welding, thereby capable of securing mounting rigidity.

Further, as in an embodiment, it is preferable that the laser-welding is performed at a position where the notch is not formed, thereby capable of securing mounting rigidity.

Moreover, in accordance with a method for manufacturing a vehicle seat according to an embodiment of the present invention, the above problem is solved by the method for manufacturing a vehicle seat including a link mechanism for liftably connecting a seat cushion to a support base directly or indirectly mounted to a vehicle body, including a step of connecting link members constituting the link mechanism to side frames arranged at both right and left ends, which constitute a seating frame becoming a frame of the seat cushion; a step of forming flange portions by connecting the link members together, pressing end portions of a link connecting member having the end portions widening into a tapered shape to the link member side against facing surfaces of the link members facing the end portions, and flexibly deforming the end portions to be parallel to the facing surfaces; a step of joining end surfaces of the flange portions and the facing surfaces of the link members by welding in a state of being abutted; and a step of connecting the link members to the support base.

In this way, in the step of forming the flange portions, the flange portions are formed by pressing the end portions of the link connecting member having the end portions widening in a tapered shape to the link member side against the facing surfaces of the link members facing the end portions, and flexibly deforming the end portions to be parallel to the facing surfaces, and in the next step, the end surfaces of the distorted and deformed flange portions and the facing surfaces of the link members are welded.

Therefore, the end surfaces of the flange portions and the facing surfaces of the link members can be abutted, thereby increasing joint rigidity.

That is to say, the rising angle of the flange portion is adjusted while being pressed to the facing surface of the link member, so that an error of the facing surface of the link member can be absorbed.

Since the link member is a molded product and is not a precision portion, an error of an extent that is not an obstacle to the function is generated in the individual flatness, angle and the like. Moreover, an error is generated also in the mounting angle and the like.

Therefore, if the flange portion whose rising angle is raised at a constant angle (perpendicular to an outer peripheral surface of a pipe) from the first is used, errors of the individual link members cannot be absorbed.

However, in various embodiments, the rising angle of the flange portion is adjusted while being pressed to the facing surface of the link member so that an error of the facing surface of the link member can be absorbed, thereby improving joint rigidity.

Moreover, in the above method for manufacturing the vehicle seat, specifically, as in an embodiment, it is preferable that the link connecting member is configured to have a hollow bore extending to the end surface of the flange portion, and on the facing surface of the link member, the convex portion projecting to the flange portion side is formed, and that in the step of forming the flange portion, the hollow bore and the convex portion are matched so that positioning of the link connecting member is facilitated, and workability is improved.

In accordance with an embodiment of the invention, the flange portions and the link members are welded at the inside of the link members so that a projection end of the link connecting member to the outside does not exist. Hence, inconveniences such as interference of the other members and the projection end of the link connecting member can be effectively avoided, and the device does not need to be increased in size in order to avoid interference thereof.

In accordance with the embodiments of the invention, a protruding portion of the link member from the outer edge is eliminated, and interference between the other members and the flange portions can be effectively suppressed, thereby contributing to a reduction in the size of the device.

In accordance with the embodiment of the invention, positioning of the link connecting member is facilitated, and misalignment thereof can be suppressed, thereby improving workability.

In accordance with the embodiments of the invention, mounting rigidity can be secured.

In accordance with an embodiment of the invention, joint rigidity is improved.

In accordance with an embodiment of the invention, positioning of the link connecting member is facilitated, and misalignment thereof can be suppressed, thereby improving workability.

BRIEF DESCRIPTION OF THE DRAWINGS

FIG. 10 is a process flowchart drawing showing a manufacturing process of the vehicle seat according to one embodiment of the present invention.

DETAILED DESCRIPTION

Figure 1:
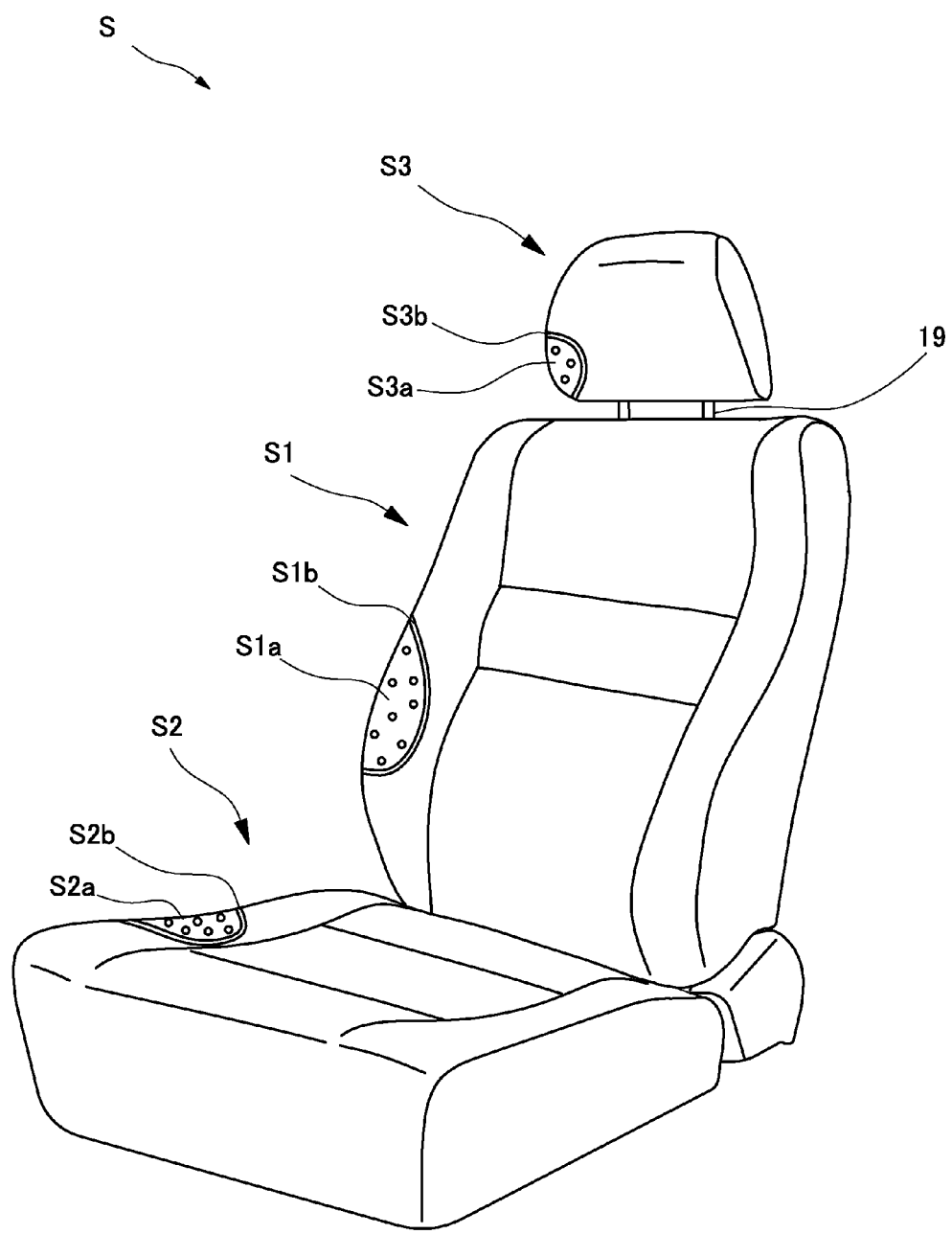
FIG. 1 is an external perspective view of a vehicle seat according to one embodiment of the present invention.

Hereinafter, a vehicle seat according to one embodiment of the present invention will be described with reference to FIG. 1 to FIG. 13.

The vehicle seat of the present embodiment includes a height adjustment mechanism and is configured to be capable of displacing the height of the vehicle seat from a floor.

Then, the height adjustment mechanism according to the present embodiment is composed of a pair of right and left link mechanisms, and thus, a link connecting member for connecting these right and left link mechanisms, and a joint structure of the link connecting member and link members will be mainly described along with a manufacturing method thereof.

In the present specification, "a pair of" is a phrase in a broad sense referring to be used in a pair in forming one product, structuring one function, or the like, and not necessarily referring to a pair of similar shapes, similar sizes, or the like.

That is to say, even if a pair is different in the shape or the size, the pair is included as long as being used in a pair in forming one product, structuring one function, or the like.

The members, the arrangements and the like described below do not limit the present invention, may be, of course, modified into various forms in accordance with the gist of the present invention, and also include equivalents of the present invention.

Moreover, in the present specification, vehicles are intended to refer to moving vehicles capable of being equipped with seats, including ground travelling vehicles having wheels such as automobiles and railroads, ships and aircrafts moving on the place other than the ground, and the like.

FIG. 1 to FIG. 13 show one embodiment of the present invention, and hereinafter, the embodiment of the present invention will be described with reference to these drawings.

In the drawings, the symbol FR shows the front of vehicle and the symbol RR shows the rear of vehicle.

Moreover, in the following description, the width direction of a vehicle seat S is the right and left direction in a state of facing the front of vehicle, and corresponds to the horizontal direction.

Structure of Vehicle Seat

In the following, firstly, the structure of the vehicle seat S will be outlined.

Since the vehicle seat S is similar to a publicly known vehicle seat except for the link mechanisms, the link connecting member, and a connecting structure thereof and the like, the description thereof will be simplified.

As shown in FIG. 1, the vehicle seat S is composed of a seat back S1 (a back portion), a seating portion S2 as a seat cushion, and a head rest S3, and the seat back S1 (the back portion) and the seating portion S2 are formed by placing cushion pads S1a, S2a on a seat frame F and covering them with skin materials S1b, S2b. The head rest S3 is formed by arranging a cushion pad material 3a on a core material (not shown) of a head portion and covering them with a skin material S3b. Moreover, the reference numeral 19 denotes a head rest pillar 19 supporting the head rest S3.

The vehicle seat S shown in FIG. 1 is an example of seats, and has the seat frame F (see FIG. 2) as a frame thereof.

The seat frame F is formed by a metallic material, and is configured by including a seating frame 2 with side frames 2a at both ends in the right and left direction, and a seat back frame 1 on the back side, respectively.

The seating frame 2 is formed by placing the cushion pad S2a as mentioned above and covering with the skin material S2b from the top of the cushion pad S2a, and is configured to support an occupant from the lower portion.

Moreover, a rear end portion of the seating frame 2 is connected to the seat back frame 1 via a reclining mechanism.

The seating frame 2 according to the present embodiment is fixed to a vehicle body floor of a vehicle body (portions of the vehicle except for a seat unit), and is mainly composed of the side frames 2a, 2a, rail mechanisms 10, and a height adjustment mechanism 7.

Figure 2:
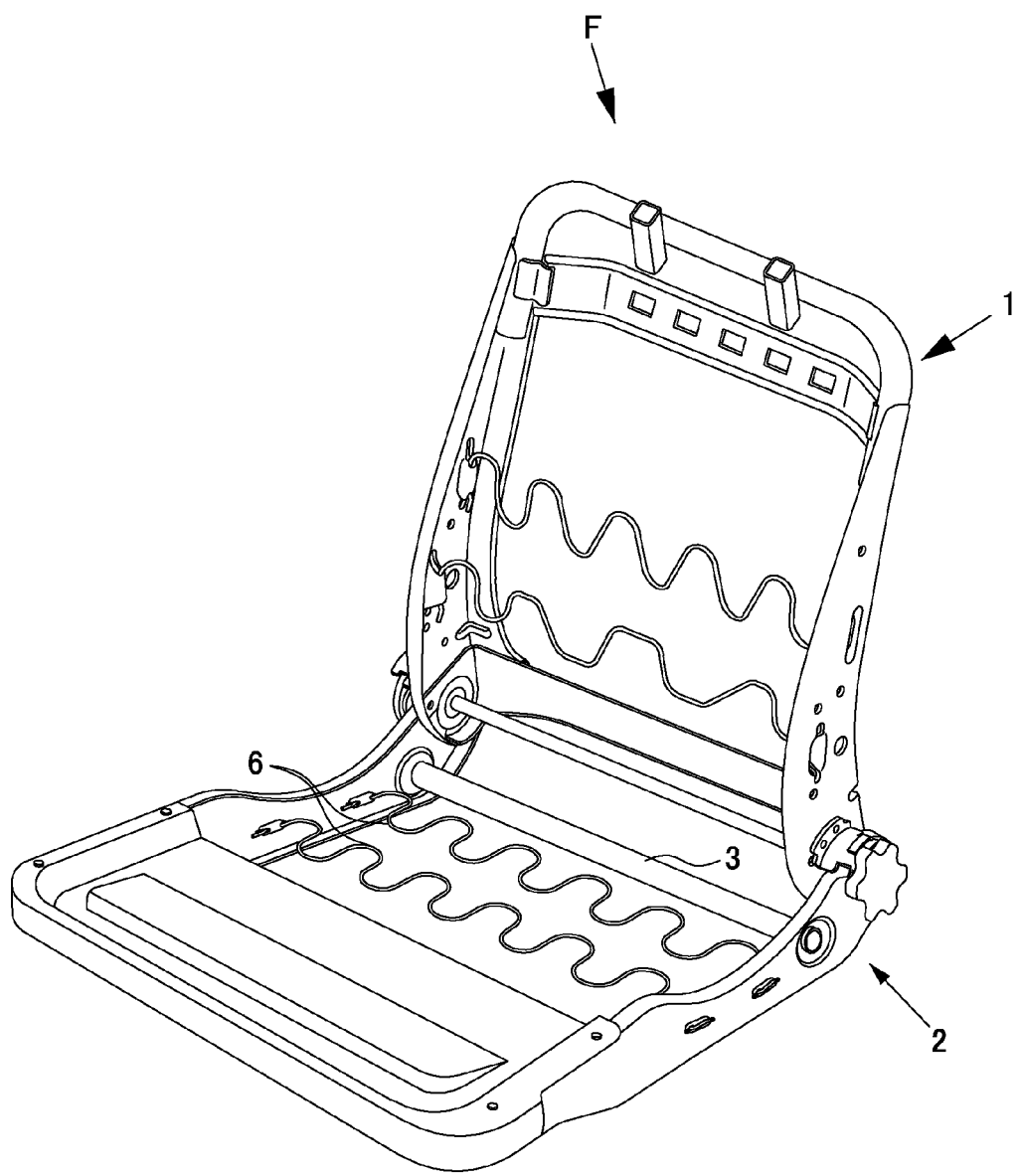
FIG. 2 is a perspective view of a seat frame according to one embodiment of the present invention.

As shown in FIG. 2, the respective side frames 2a constituting the seating frame 2 are sheet metal members extending in the front to back direction, and are connected to the seat back frame 1 at the rear end portion. Moreover, the side frame 2a on one end side in the right and left direction (the left side) and the side frame 2a on the other end side in the right and left direction (the right side) are spaced in the right and left direction in a state of being parallel to each other.

The side frames 2a are connected together at the rear end side by way of a rear connecting member 3 and connected together at the front side by way of a front connecting member 4, via the respective link members constituting link mechanisms L (described later).

The front connecting member 4 corresponds to "the link connecting member" in the embodiments.

The front connecting member 4 and the rear connecting member 3 are components of a driving side link mechanism L1 and a driven side link mechanism L2 (both are described later) respectively, and are pipe members extending from one end to the other end in the width direction of the vehicle seat S.

Moreover, on both end portions of the front connecting member 4, flange portions 42, 42 are formed to surround the periphery of openings respectively.

As described later, the front connecting member 4 is welded and fixed to a driven side link member 72 constituting the link mechanisms L (the mechanism constituting the height adjustment mechanism 7) described later.

Moreover, the rear connecting member 3 is fixed at both end portions thereof to a driving side link member 71 constituting the link mechanisms L (the mechanism constituting the height adjustment mechanism 7) described later.

That is to say, the front connecting member 4 is arranged on the vehicle front side, and bridges the vehicle front sides of the side frames 2a, 2a on both sides via the driven side link member 72 constituting the link mechanisms L.

Moreover, the rear connecting member 3 is arranged on the vehicle rear side, and bridges the vehicle rear sides of the side frames 2a, 2a on the both sides via the driving side link member 71 constituting the link mechanisms L.

The mounting structure of the link mechanism L and the front connecting member 4 is a main configuration of the present invention, and therefore will be described in detail in the description of the height adjustment mechanism 7.

Moreover, a plurality of S springs 6 (four in the case shown in FIG. 2) are arranged between the side frames 2a. The S springs 6 are support springs supporting a cushion body from below, and extend in the front to back direction while meandering.

The bridging method of the respective S springs 6 is not specifically limited and may be a publicly known method. For example, the S springs 6 may be arranged between the side frames 2a by hanging the front end portions thereof on a bridge-construction pan (not shown) bridge-constructed between the side frames 2a and hanging the rear end portions thereof on the above-mentioned rear connecting member 3 (more specifically, a generally circular arc-shaped hooking member fitted into the connecting member; not shown). Then, in this example, the cushion body is installed on the bridge-construction pan and the S springs 6.

The structure of the side frame 2a will be described.

The side frame 2a is formed by processing an elongated sheet metal, and the front end portion thereof is bent inwardly to define the front end of the vehicle seat S.

Moreover, two circular holes through which rotating shafts arranged on the height adjustment mechanism 7 are passed are provided in a position on a slightly rear side than the front end of the side frame 2a and in a position on a slightly front side than the rear end thereof respectively.

The circular holes will be described as "a first link shaft through-hole 21a" and "a second link shaft through-hole 21b" in order from the vehicle front side.

Each shaft constituting the link mechanisms L is passed through these "the first link shaft through-hole 21a" and "the second link shaft through-hole 21b".

As shown in FIG. 2, the rail mechanisms 10 are provided in a pair, and one rail mechanism 10 (on the left side) and the other rail mechanism 10 (on the right side) are spaced in the right and left direction in a state of being parallel to each other.

Each rail mechanism 10 has lower rails 11 fixed to the vehicle body floor, and upper rails 12 engaged with the lower rails 11 and capable of slidingly moving on the lower rails 11.

Both lower rails 11 and upper rails 12 are provided in a pair, and the respective rails extend along the front to back direction.

The pair of upper rails 12 are lined up to be spaced in the right and left direction in a state of being parallel to each other, and the upper rails 12 are connected by way of a slide lever 17 therebetween.

On the other hand, as shown in FIG. 2, the pair of lower rails 11 are lined up to be spaced in the right and left direction in a state of being parallel to each other, and the lower rails 11 are connected by way of a member frame (not shown) therebetween.

Moreover, on the respective lower surfaces of the lower rails 11, a support bracket (not shown) is mounted. By fastening the support bracket to the vehicle body floor, the lower rails 11 are fixed to the vehicle body floor.

Then, on the respective lower rails 11, the vehicle seat S is placed via the height adjustment mechanism 7.

In more detail, on the lower rails 11, the upper rails 12 are slidably arranged, and further on the upper rails 12, mounting brackets 15 are fixed by way of bolts 18 and nuts as fastening members.

The link mechanisms L constituting the height adjustment mechanism 7 are mounted to the mounting brackets 15, and the side frames 2a, 2a of the vehicle seat S are connected to the height adjustment mechanism 7, thereby the vehicle seat S is connected to the respective upper rails 12 to be movable in the front to back direction and the up and down direction.

In a state that the vehicle seat S is connected to the respective lower rails 11 via the height adjustment mechanism 7, the side frame 2a on one end side in the right and left direction (the left side) is located above the lower rail 11 on one end side in the right and left direction (the left side), and the side frame 2a on the other end side in the right and left direction (the right side) is located above the lower rail 11 on the other end side in the right and left direction.

Moreover, in a state that the vehicle seat S is placed on the respective lower rails 11 via the height adjustment mechanism 7, the plurality of S springs 6 mentioned above are located between the lower rails 11 in a state of being lined up in the right and left direction, respectively.

Height Adjustment Mechanism

Next, the height adjustment mechanism 7 according to the present embodiment will be described with reference to FIGS. 3A-3C.

In the following description, if necessary, of a pair of rail members (for example, the lower rails 11), one is referred to as a first rail member and the other is referred to as a second rail member. Here, the first rail member and the second rail member are relative concepts, if one rail member is assumed to be the first rail member, the other rail member (that is, the other rail member lined up to be spaced from the first rail member along the width direction of the vehicle seat S) is assumed to be the second rail member, and for example, when the rail member on the left side (the right side) is assumed to be the first rail member, the rail member on the right side (the left side) is assumed to be the second rail member.

Moreover, for the purpose of illustration, in the width direction of the vehicle seat S, the side on which the second rail member is located when viewed from the first rail member is referred to as the inside, and the side opposite to the side on which the second rail member is located when viewed from the first rail member is referred to as the outside.

Hereinafter, in a case where the right and left configurations are common, only the configuration of one end side in the width direction of the vehicle seat S will be described.

The height adjustment mechanism 7 according to the present embodiment is configured by including two mounting brackets 15 for mounting links, and the link mechanisms L installed thereon respectively.

In the present embodiment, the side of the link member arranged on the rear side becomes the driving side, and the side of the link member arranged on the front side becomes the driven side.

That is to say, on the side arranged on the rear side, an input device is arranged, and the input device is configured to drive the height adjustment mechanism 7 by a power input from the outside (for example, a power by manipulations of the occupant).

Since the input device has a publicly known configuration in which a sector gear, a rotation transmission mechanism, a start-up restricting member, a pinion gear and the like are combined, the description thereof will be omitted.

The mounting bracket 15 according to the present embodiment is configured separately from the upper rails 12, extends along the front to back direction of the vehicle seat S, and is detachably fixed to the upper surfaces of the upper rails 12 by way of bolts (not shown) as an example of the fastening members.

In this way, the mounting brackets 15, 15 for mounting the driving side link mechanism L1 and the driven side link mechanism L2 are separated from the upper rails 12, thereby the seat design can be easily changed even if there is any change, and versatility is improved and maintainability is also improved.

In the present embodiment, two mounting brackets 15 are mounted respectively along the longitudinal direction (in other words, the front to back direction of the vehicle seat S) of two upper rails 12.

Then, the link mechanisms L are mounted to these two mounting brackets 15.

For the purpose of illustration, the side arranged on the vehicle rear side will be described as "the driving side link mechanism L1" and the side arranged on the vehicle front side will be described as "the driven side link mechanism L2".

The mounting brackets 15 are formed in a substantially U-shape in a front view (when viewed from the front), and are fixed to the upper surfaces of the upper rails 12 along the longitudinal direction thereof (along the front to back direction) such that the center of the width direction thereof overlaps with the center of the width direction of the upper rails 12.

As mentioned above, the mounting brackets 15 are fixed to the upper surfaces of the upper rails 12 by way of bolts (not shown) as the fastening members.

Figure 4:
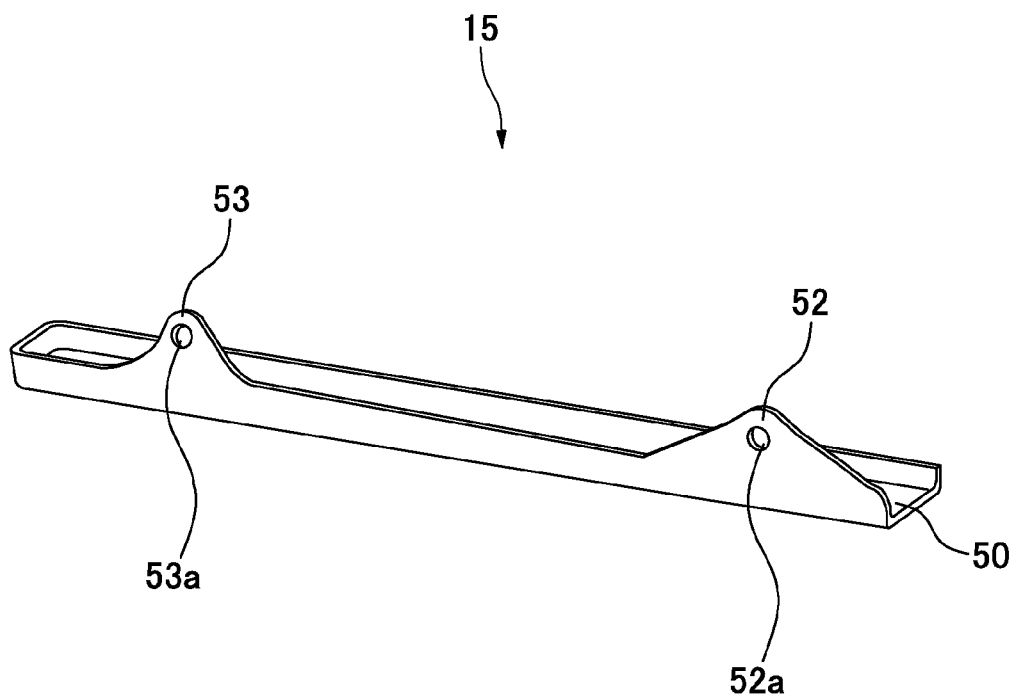
FIG. 4 is a perspective view of a bracket according to one embodiment of the present invention.

As shown in FIG. 4, the mounting bracket 15 according to the present embodiment is configured by including a bottom wall portion 50 of a substantially rectangular plate body formed in the width (the distance of the right and left direction of the vehicle) almost identical to the width (the distance of the right and left direction of the vehicle) of the upper surface of the upper rail 12, and a front link mounting portion 52 (raised on the vehicle front side end portion) and a rear link mounting portion 53 (raised on the vehicle rear side end portion) raised upward of the vehicle from the long side thereof of the vehicle inside.

An outside raised edge (a raised edge raised from the vehicle front side end portion to slightly backward than the center of the longitudinal direction) raised upward of the vehicle from the long side of the vehicle outside, or other member mounting pieces (raised on the vehicle rear side end portion) raised upward of the vehicle from behind the long side of the vehicle outside may be included.

As described above, the bottom wall portion 50 is a substantially rectangular plate body portion, has the width (the distance of the right and left direction of the vehicle) almost identical to the width (the distance of the right and left direction of the vehicle) of the upper surface of the upper rail 12, and is mounted along the longitudinal direction (the front to back direction of the vehicle) of the upper surface of the upper rail 12.

In the bottom wall portion 50, bolt holes (not shown) for inserting the bolts therein are formed.

In the present embodiment, the bolt holes (not shown) are formed one by one in both end portions in the front to back direction of the vehicle.

The bolt holes may be formed as long holes (loose holes) along the longitudinal direction (the front to back direction of the vehicle seat S) of the upper rails 12.

If the bolt holes are thus formed as the loose holes, in fixing the mounting brackets 15 on the upper rails 12, the nuts are temporarily assembled by inserting the bolts in the above bolt holes, after that the mounting brackets 15 can be moved along the longitudinal direction of the upper rails 12.

Therefore, as thus configured, the fixing positions of the mounting brackets 15 in the upper rails 12 as rail members can be adjusted along the longitudinal direction of the upper rails 12.

Thereby, adjustment of the fixing positions of the mounting brackets 15 can be performed easily and with accuracy.

Of course, the above bolt holes may have the size of an extent capable of adjusting the fixing positions of the mounting brackets 15, and as long as they have such size, the bolt holes may be circular holes of an exact-circle shape and the bolt holes in the front to back direction may be combinations thereof.

The front link mounting portion 52 is a substantially triangular plate body portion raised upward of the vehicle from the vehicle front side end portion of the long side inside of the bottom wall portion 50, and in the portion corresponding to the apex angle thereof, a front insertion hole 52a in which a fourth link shaft 7d being the rotating shaft is inserted in mounting the driven side link mechanism L2 (it is not limited to this example, but may be the driving side link mechanism L1) is formed.

The front insertion hole 52a is a through-hole formed along the thickness direction of the mounting bracket 15.

Similarly, the rear link mounting portion 53 is a substantially triangular plate body portion raised upward of the vehicle from the vehicle rear side end portion of the long side outside of the bottom wall portion 50, and in the portion corresponding to the apex angle thereof, a rear insertion hole 53a in which a second link shaft 7b being the rotating shaft is inserted in mounting the driving side link mechanism L1 (it is not limited to this example, but may be the driven side link mechanism L2) is formed.

The rear insertion hole 53a is a through-hole formed along the thickness direction of the mounting bracket 15.

If the outside raised edge is provided, it is a raised wall raised from the vehicle front side end portion to slightly backward than the center of the longitudinal direction.

When the outside raised edge is provided, rigidity of the mounting brackets 15 is improved. As a result, mounting rigidity of the driving side link mechanism L1 and the driven side link mechanism L2 can be increased.

The outside raised edge is raised almost perpendicularly from the bottom wall portion 50 but is not limited thereto, and may project to be raised at an inclination that makes an obtuse angle with respect to the bottom wall portion 50, for example.

If the other member mounting pieces are formed, they may be formed to be raised upward of the vehicle from the vehicle rear side end portion of the long side of the vehicle outside.

On the other member mounting pieces, end portions or the like of members for swinging the seat back frame 1 with respect to the seating frame 2 can be arranged, but the description and illustration thereof will be omitted because of no direct relation to the present invention.

The link mechanism L according to the present embodiment is configured by including the driving side link mechanism L1 and the driven side link mechanism L2.

The driving side link mechanism L1 according to the present embodiment is configured by including a pair of driving side link members 71, 71 and the rear connecting member 4.

An input device is arranged on the driving side link mechanism L1, and that the input device is configured to drive the height adjustment mechanism 7 by a power input from the outside (for example, a power by manipulations of the occupant).

Since the input device has a publicly known configuration in which a sector gear, a rotation transmission mechanism, a start-up restricting member, a pinion gear and the like are combined, the description thereof will be omitted.

The driving side link member 71 according to the present embodiment is a flat plate shaped link member slightly bent into a substantially dogleg shape, and is formed with three shaft through-holes therein.

The shaft through-holes formed in the driving side link member 71 are formed, one by one in the both end portions in the longitudinal direction and one in the vicinity of the bent portion, and will be described as "a driving side first hole 71a", "a driving side second hole 71b", and "a driving side third hole 71c" in order from the side arranged on the lower portion of the vehicle in a seat height neutral state (the state shown in FIG. 3B).

For example, in the present embodiment, on the vehicle rear side (in the vicinity of the rear portion of the driving side first hole 71a) of the driving side link member 71, a restriction portion which abuts to the upper surface of the bottom wall portion 50 of the mounting bracket 15 and stops pivot of the driving side link member 71 may be formed in a lower position (the state shown in FIG. 3C) being the lowest position.

For example, the restriction portion may be formed as a projection portion projecting to the vehicle rear side from the driving side link member 71.

Moreover, the thickness (at least, the thickness of the periphery of the driving side first hole 71a) of the driving side link member 71 is configured to be larger than the rear side link mounting portion 53 formed on the mounting bracket 15 (at least, the thickness of the periphery of the rear side insertion hole 53a) or the side frame 2a (at least, the thickness of the periphery of the second link shaft through-hole 21b).

By such a configuration, mounting rigidity of the driving side link member 71 is increased.

Hereinafter, the mounting state of these driving side link members 71, 71 and the rear connecting member 3 will be described.

A first link shaft 7a is passed through the second link shaft through-hole 21b formed in the side frame 2a. The side frame 2a and the driving side link member 71 are rotatably supported by the first link shaft 7a.

That is to say, the side frame 2a and the driving side link member 71 are layered in a state that the second link shaft through-hole 21b (formed in the side frame 2a) and the driving side third hole 71c (formed in the driving side link member 71) are communicating with each other, and the first link shaft 7a is pivotally inserted in the communication hole.

Moreover, the vehicle lower side end portion of the driving side link member 71 and the front link mounting portion 52 formed on the mounting bracket 15 are layered in a state that the driving side first hole 71a (formed in the vehicle lower side end portion of the driving side link member 71) and the rear insertion hole 53a (formed in the mounting bracket 15) are communicating with each other, and the second link shaft 7b is inserted in the communication hole.

Further, one end portion of the rear connecting member 3 is inserted in the driving side second hole 71b formed in almost the central portion of the driving side link member 71.

As thus configured, the driving side link mechanism L1 according to the present embodiment swings around the second link shaft 7b by a power input from the input device (not shown), and according to this swing, the side frame 2a and the rear connecting member 3 which are mounted to the driving side link member 71 swing.

Moreover, since the both driving side link members 71, 71 are connected by way of the rear connecting member 3, the both side frames 2a, 2a connected to them swing jointly according to the swing of the both driving side link members 71, 71.

Next, the driven side link mechanism L2 will be described.

The driven side link mechanism L2 according to the present embodiment is configured by including a pair of driven side link members 72, 72 and the front connecting member 3.

Figure 5:
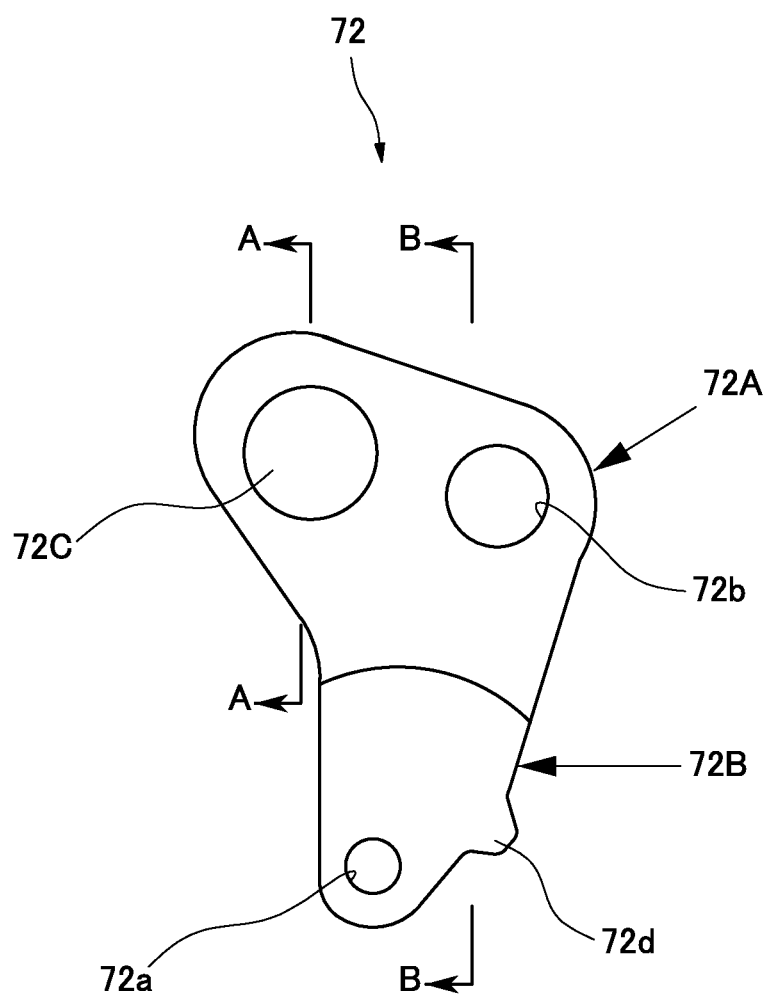
FIG. 5 is a plan view of a front link member according to one embodiment of the present invention.
Figure 6A:
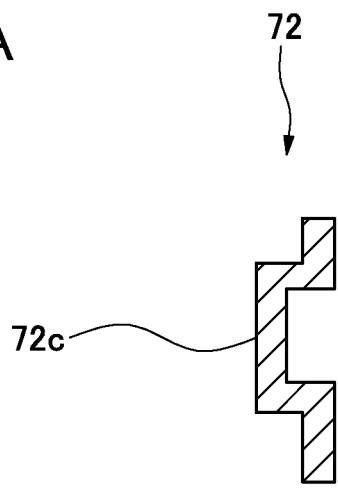
FIG. 6A is an A-A line cross-sectional view and FIG. 6B is a B-B line cross sectional view of FIG. 5.
Figure 6B:
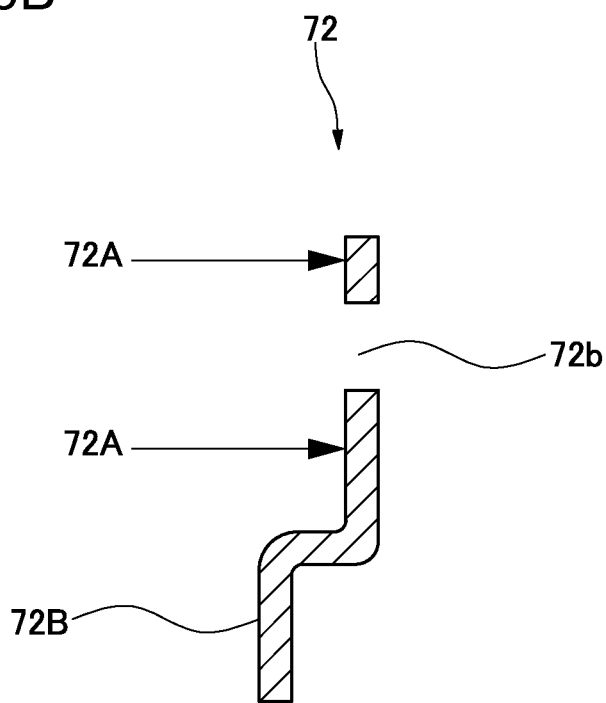

As shown in FIG. 5 and FIGS. 6A-6B, the driven side link member 72 according to the present embodiment is a flat plate shaped link member formed into a substantially fan shape to increase the area toward the upper portion from the lower portion.

FIG. 6A is an A-A line cross-sectional view of FIG. 5, and FIG. 6B is a B-B line cross-sectional view of FIG. 5.

The shaft through-holes formed in the driven side link member 72 are formed one by one in the both end portions in the longitudinal direction, and will be described as "a driven side first hole 72a" and "a driven side second hole 72b" in order from the side arranged on the lower portion of the vehicle in the seat height neutral state (the state shown in FIG. 3B).

On a position parallel to the driven side second hole 72b, an engaging projection 72c projecting than a body surface of the driven side link member 72 is formed.

The engaging projection 72c is a projection projecting into a bottomed cylindrical shape having a circular bottom surface (the circular bottom surface side is projected) (see FIG. 5 and FIG. 6A).

The outside diameter of the circular bottom surface of the engaging projection 72c is formed to be almost identical to the inside diameter of a pipe portion 41 constituting the front connecting member 4, and the end portion of the pipe portion 41 is configured to engage with the engaging projection 72c.

The engaging projection 72c is used when the front connecting member 4 is connected to the driven side link member 72, but the configuration thereof will be described later.

Moreover, the vicinity of the driven side first hole 72a (the portion whose area is small in a plan view of the driven side link member 72) of the driven side link member 72 projects in the same direction as the projecting direction of the engaging projection 72c (see FIG. 5 and FIG. 6B).

That is to say, a stepped portion 72B slightly projecting than a body portion 72A where the engaging projection 72c and the driven side second hole 72b are formed is formed, and in the stepped portion 72B, the driven side first hole 72a is formed.

The stepped portion 72B is formed in order to avoid interference to peripherally arranged members when the driven side link member 72 swings.

In the present embodiment, on the vehicle rear side (in the vicinity of the rear portion of the stepped portion 72B) of the driven side link member 72, a restriction portion 72d which abuts to the upper surface of the bottom wall portion 50 of the mounting bracket 15 and stops pivot of the driven side link member 72 is formed in the lower position (the state shown in FIG. 3C) being the lowest position.

The restriction portion 72d is formed as a projection portion projecting to the vehicle rear side from the driven side link member 72.

Hereinafter, the mounting state of these driven side link members 72, 72 and the front connecting member 4 will be described (see FIGS. 3A-3C).

The third link shaft 7c is passed through the first link shaft through-hole 21a formed in the side frame 2a. The side frame 2a and the driven side link member 72 are rotatably supported by the third link shaft 7c via a washer W.

That is to say, the side frame 2a and the driven side link member 72 are layered in a state that the first link shaft through-hole 21a (formed in the side frame 2a) and the driven side second hole 72b (formed in the driven side link member 72) are communicating with each other, and the third link shaft 7c is pivotably inserted in the communication hole.

Moreover, the vehicle lower side end portion of the driven side link member 72 and the front link mounting portion 52 formed on the mounting bracket 15 are layered in a state that the driven side first hole 72a (formed in the vehicle lower side end portion of the driven side link member 72) and the front insertion hole 52a (formed in the mounting bracket 15) are communicating with each other, and the fourth link shaft 7d is inserted in the communication hole.

Further, one end portion of the front connecting member 4 is welded and fixed to the engaging projection 72c portion formed on the driven side link member 72.

As thus configured, the driven side link mechanism L2 according to the present embodiment swings around the fourth link shaft 7d by the power transmitted by the driving side link mechanism L1 upon the power input from the input device (not shown), and according to this swing, the side frame 2a and the front connecting member 4 which are mounted to the driven side link member 72 swing.

Moreover, since the both driven side link members 72, 72 are connected by way of the front connecting member 4, the both side frames 2a, 2a connected to them swing jointly according to the swing of the both driven side link members 72, 72.

Figure 3A:
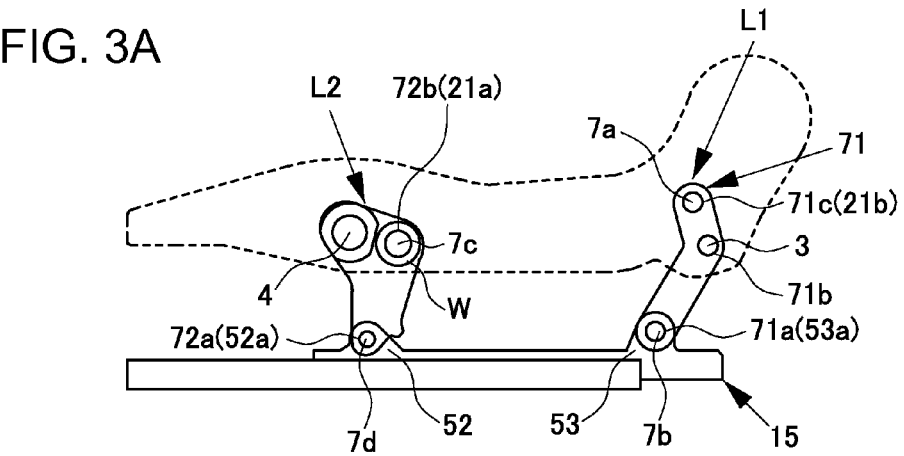
FIGS. 3A-3C are explanatory side views showing a link mechanism according to one embodiment of the present invention, and a state of moving the vehicle seat up and down by way of the link mechanism.
Figure 3B:
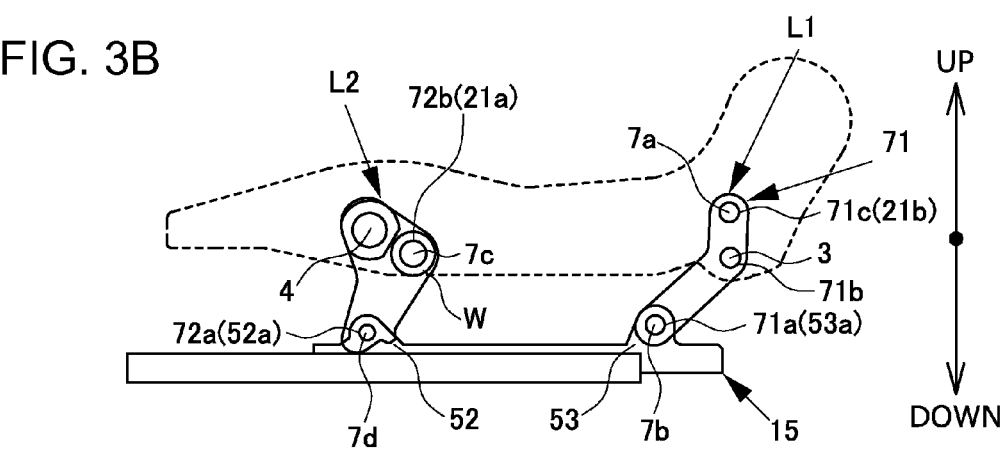
Figure 3C:
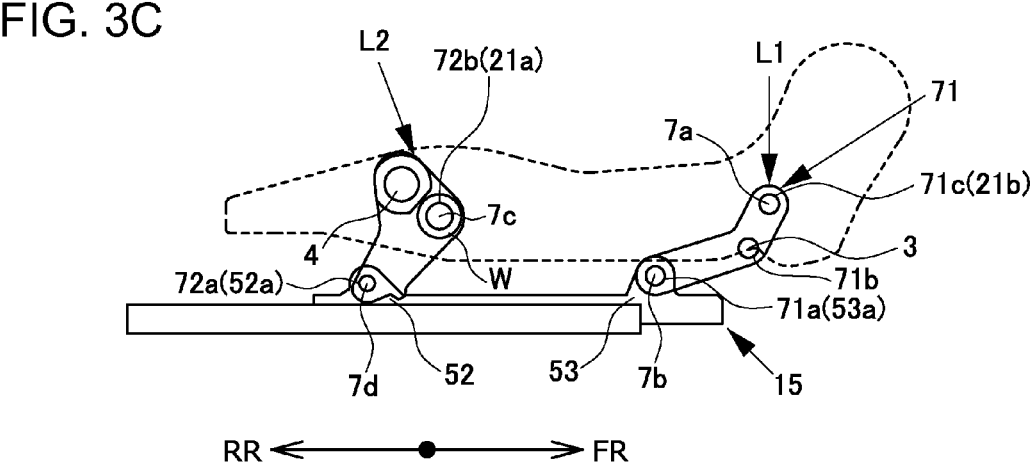

In this way, by the driving side link mechanism L1 and the driven side link mechanism L2, the side frames 2a, 2a can displace the height position thereof, as shown in FIGS. 3A-3C.

With reference to FIGS. 3A-3C, the movement of the height adjustment mechanism 7 by way of the link mechanisms L thus configured will be briefly described.

FIG. 3B shows a midway point (a neutral position).

In this state, if there is a power input from the input device (not shown) (for example, rotation to one direction of a rotational operating portion, and in a case where there is a lever extending to the vehicle front side from the rotational operating portion, flip-up of the lever, or the like), the driving side link member 71 swings and is raised, and the side frame 2a connected to it rises.

Moreover, at the same time, the driven side link member 72 also swings and is raised, and also the front side of the side frame 2a connected to it rises simultaneously with the rear side and is displaced to a lifting point (the upper position) of FIG. 3A.

As described above, the both side frames 2a, 2a are connected by way of the rear connecting member 3 and the front connecting member 4 via the driving side link member 71 and the driven side link member 72 respectively, so that they can be displaced by following with each other.

In contrast, from the neutral position, if there is a power input from the input device (not shown) (for example, rotation to the other direction of the rotational operating portion, and in a case where there is a lever extending to the vehicle front side from the rotational operating portion, flip-down of the lever, or the like), the driving side link member 71 swings and the upper portion thereof is laid toward the vehicle rear side, and the side frame 2a connected to it falls.

Moreover, at the same time, the driven side link member 72 also swings and the upper portion thereof is laid toward the vehicle rear side, and also the front side of the side frame 2a connected to it falls simultaneously with the rear side and is displaced to a falling point (the lower position) of FIG. 3B.

As described above, the both side frames 2a, 2a are connected by way of the rear connecting member 3 and the front connecting member 4 via the driving side link member 71 and the driven side link member 72 respectively so that they can be displaced by following with each other.

Details of Driven Side Link Member and Front Connecting Member, and Connecting Method Thereof Next, with reference to FIG. 7 to FIG. 12B, details of the driven side link member 72 and the front connecting member 4, and the connecting method thereof will be described.

Firstly, the configuration of the front connecting member 4 will be described in detail.

Figure 7A:
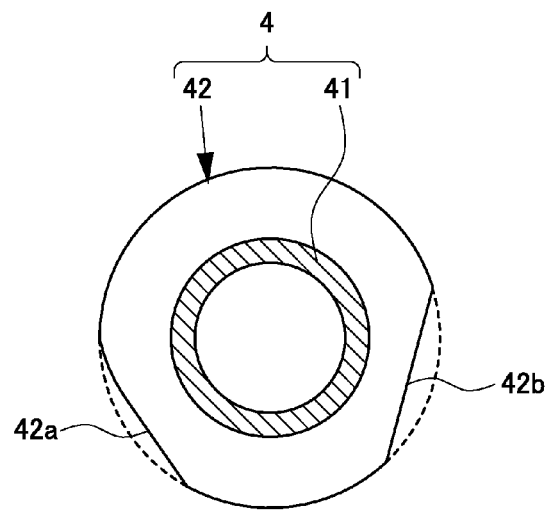
FIGS. 7A, 7B are explanatory side and end views showing a link connecting member according to one embodiment of the present invention.
Figure 7B:
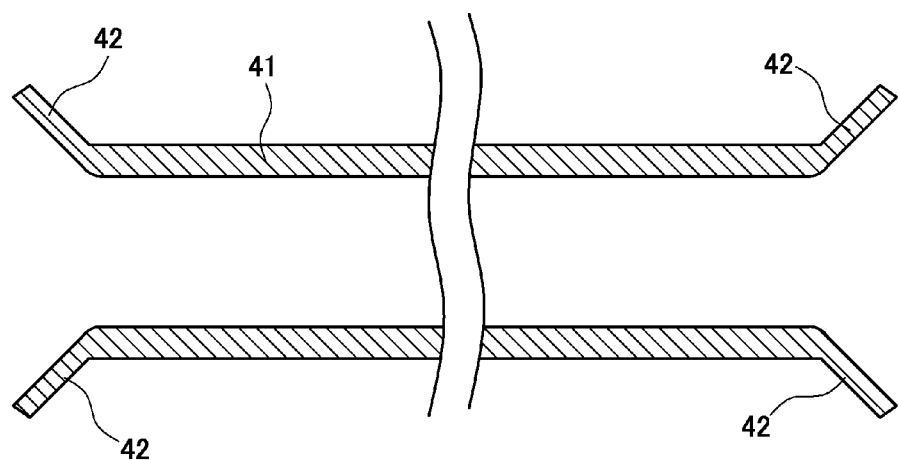

FIG. 7A is a cross-sectional view cut the vicinity of the center of the front connecting member 4 by the surface perpendicular to the axial direction (the longitudinal direction), and FIG. 7B is a cross-sectional view cut the front connecting member 4 by the surface parallel to the axial direction (the longitudinal direction).

As shown in FIGS. 7A-B, the front connecting member 4 is configured by including the cylindrical pipe portion 41, and the flange shaped flange portions 42, 42 formed to surround circular openings of both end portions thereof respectively.

As shown in FIG. 7B, the flange portions 42 are not raised almost perpendicularly to the outer peripheral surface of the pipe portion 41, but are raised at an obtuse angle with respect to the outer peripheral surface of the pipe portion 41 in a state of being portions before arrangement.

That is to say, the flange portions 42 are formed into a tapered shape (a trumpet shape in a three-dimensional shape).

This is for efficiently performing welding, and as described later, in a state of being welded to the driven side link member 72, the flange portions 42 are raised to be almost parallel to the internal surface of the driven side link member 72 (almost perpendicularly to the outer peripheral surface of the pipe portion 41, in the present embodiment).

Moreover, the wall thickness of the flange portion 42 is configured to be thinner than the wall thickness of the pipe portion 41.

This is for facilitating to change the angle of the flange portion 42 in fixing it to the driven side link member 72.

Further, the wall thickness of the flange portion 42 is configured to be smaller than the wall thickness of the washer W arranged adjacently.

Moreover, as shown in FIG. 7A, the outer periphery of the flange portion 42 is not an exact-circle shape but has a shape formed by slightly notching the outer peripheral portion.

In the present embodiment, the example in which two spots are notched is shown. However, the notched spots and the number of notches and the like are not limited thereto, and can be appropriately changed without departing from the gist of the present invention.

Hereinafter, one notch of the flange portion 42 will be described as "a first notch 42a", and the other notch will be described as "a second notch 42b".

The first notch 42a is formed in a position arranged on the outer peripheral portion of the driven side link member 72.

Figure 8:
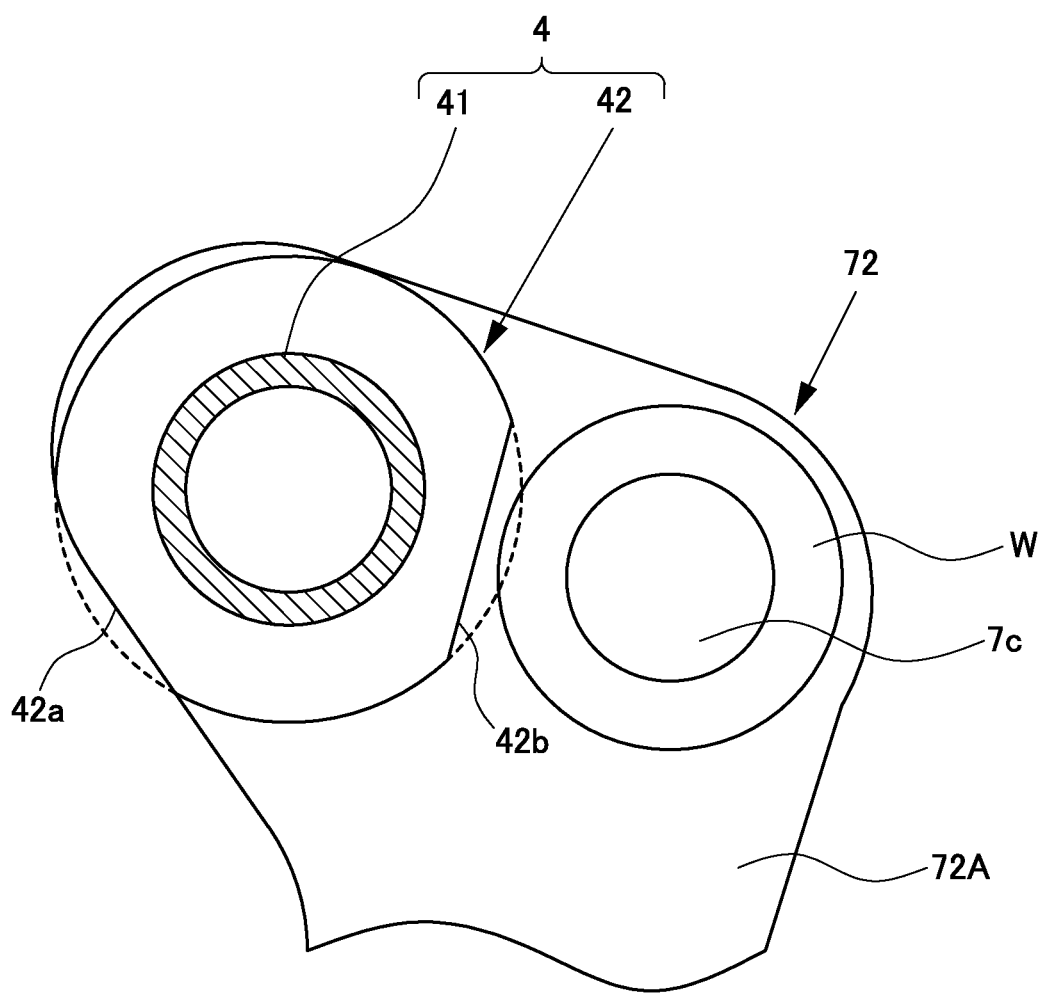
FIG. 8 is an explanatory plan view showing a state that the front link member and the link connecting member according to one embodiment of the present invention are connected.

As shown in FIG. 8, the first notch 42a is notched along the outer peripheral shape of the driven side link member 72 (the outer peripheral shape of the body portion 72A) in fixing it on the driven side link member 72.

In the present embodiment, the first notch 42a is, in a position matched to a corner of the internal surface of the driven side link member 72, notched along the shape of the corner.

As thus configured, in a plan view, the flange portions 42 do not protrude from the driven side link member 72, and therefore, interference of the flange portions 42 to the other members can be effectively suppressed when the driven side link member 72 swings.

The second notch 42b is formed in the driven side second hole 72b side formed in the driven side link member 72.

This is for bringing the front connecting member 4 close to the driven side second hole 72b (the third link shaft 7c) as much as possible and for avoiding interference of the front connecting member 4 to the washer W which is used for passing the third link shaft 7c through the driven side second hole 72b when it is brought close to the driven side second hole 72b.

The wall thickness of the flange portion 42 formed with the second notch 42b is configured to be thinner than the wall thickness of the washer W.

Next, the method for manufacturing the vehicle seat S will be described with a focus on the method for joining the front connecting member 4 to the driven side link member 72.

Figure 9:
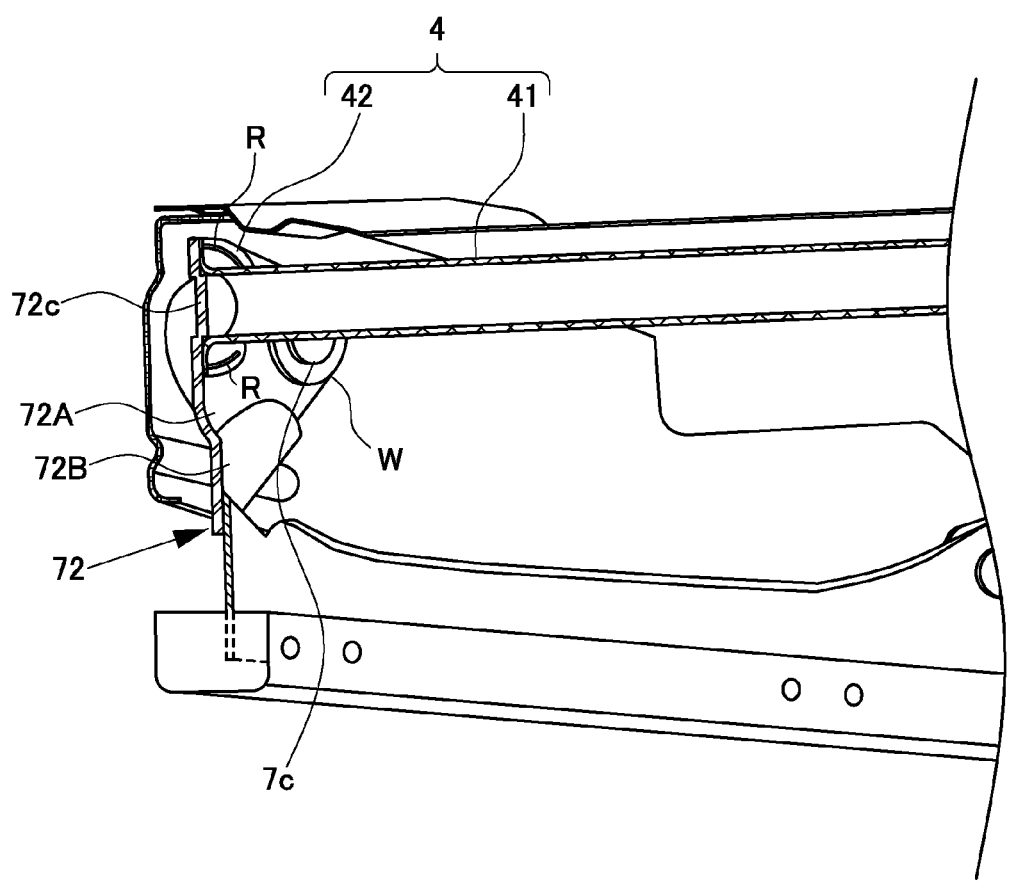
FIG. 9 is an explanatory cross-sectional view showing the state that the front link member and the link connecting member according to one embodiment of the present invention are connected.

As shown in FIG. 9, the front connecting member 4 is joined by welding the flange portion 42 thereof to the position (welding points R) of the engaging projection 72c formed on the driven side link member 72.

FIG. 10 shows the manufacturing process of the vehicle seat S.

In the process, "the method for joining the front connecting member 4 to the driven side link member 72" being a main configuration of the present invention will be mainly described, and a publicly known method is adopted for assembling of other portions and members and therefore the description thereof will be omitted.

Firstly, in Step 1, the link mechanism L is connected.

This is a step of connecting the driving side link members 71, 71 and the driven side link members 72, 72 constituting the link mechanisms L to the side frames 2a, 2a.

Specifically, this step is performed by inserting the first link shaft 7a in the communication hole between the second link shaft through-hole 21b (the side frame 2a side) and the driving side third hole 71c (the driving side link member 71 side) and rotatably supporting them, and by inserting the third link shaft 7c in the communication hole between the first link shaft through-hole 21a (the side frame 2a side) and the driven side second hole 72b and rotatably supporting them.

Next, in Step 2, the flange portions 42 are formed.

Specifically, this is a step of raising the flange portions 42 raised at an obtuse angle with respect to the outer peripheral surface of the pipe portion 41 to be almost parallel to the internal surface of the driven side link member 72 (almost perpendicularly to the outer peripheral surface of the pipe portion 41, in the present embodiment) by applying a physical power.

That is to say, "forming the flange portions 42" refers to "changing the angle with respect to the outer peripheral surface of the pipe portion".

Figure 11A:
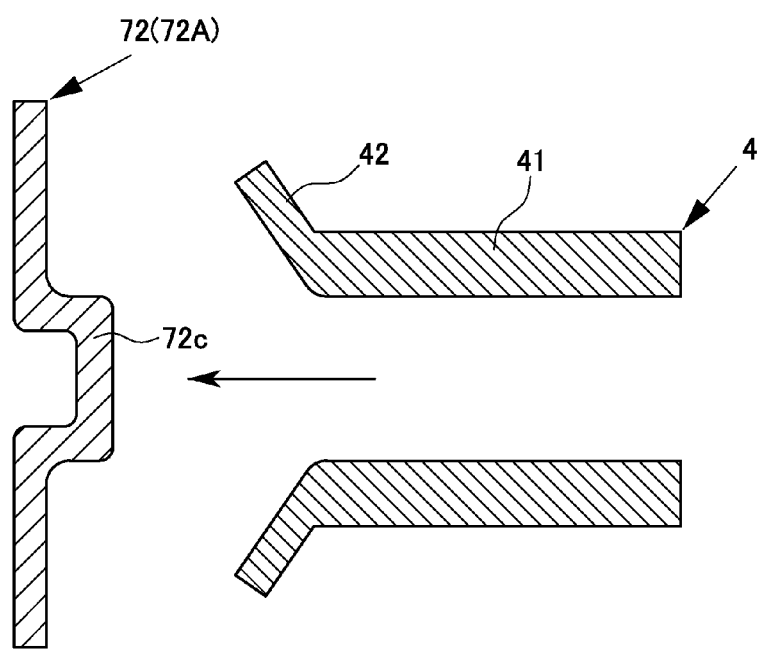
FIGS. 11A, 11B are explanatory cross-sectional side views showing a joint process of the front link member and the link connecting member according to one embodiment of the present invention.
Figure 11B:
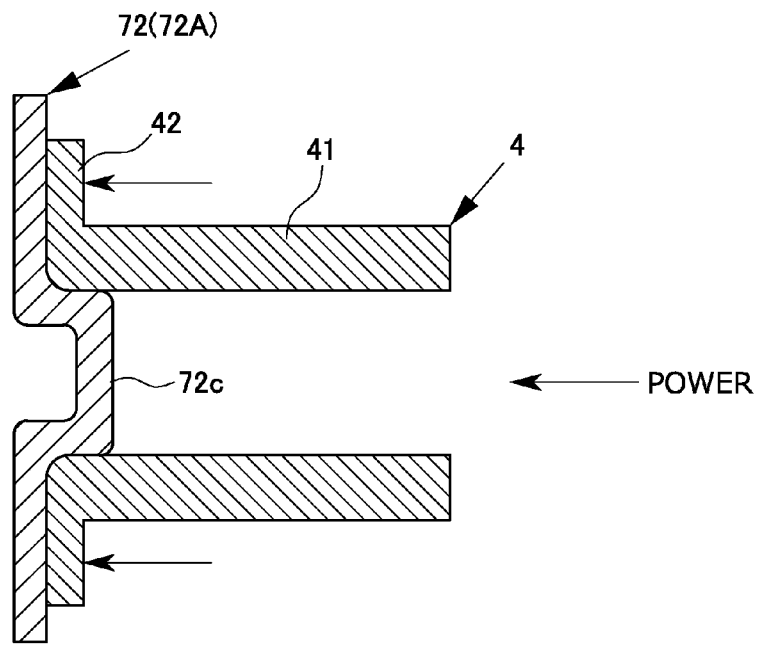

As shown in FIGS. 11A-11B, although the flange portions 42 are arranged in the position of the engaging projection 72c formed on the driven side link member 72, the outside diameter of the circular bottom surface of the engaging projection 72c is formed to be almost identical to the inside diameter of the pipe portion 41 constituting the front connecting member 4 as mentioned above, and therefore the end portion of the pipe portion 41 is positioned by engaging with the engaging projection 72c.

In this state, when a physical power is applied as shown by arrows of FIG. 11B, the flange portions 42 are bent at boundary portions between the end portion of the pipe portion 41 and the flange portions 42 and are pressed against the driven side link member 72 (the body portion 72A) in a state of being raised to be almost parallel to the internal surface of the driven side link member 72 (almost perpendicularly to the outer peripheral surface of the pipe portion 41, in the present embodiment).

In such a manner, the flange portions 42 are formed.

In the present embodiment, the engaging projection 72c and the end portion of the pipe portion 41 are configured to be fitted but are not limited thereto, they may be configured to be capable of being strongly fixed in a fitting state, and on the contrary, they may be in a loosely fitting state to some extent as long as positioning is possible.

By the engaging projection 72c, misalignment of the front connecting member 4 on the driven side link member 72 can be effectively suppressed.

Returning to FIG. 10, next, welding is performed, in Step 3.

In the present embodiment, the flange portions 42 are joined to the driven side link member 72 (the body portion 72A) by laser-welding.

Figure 12A:
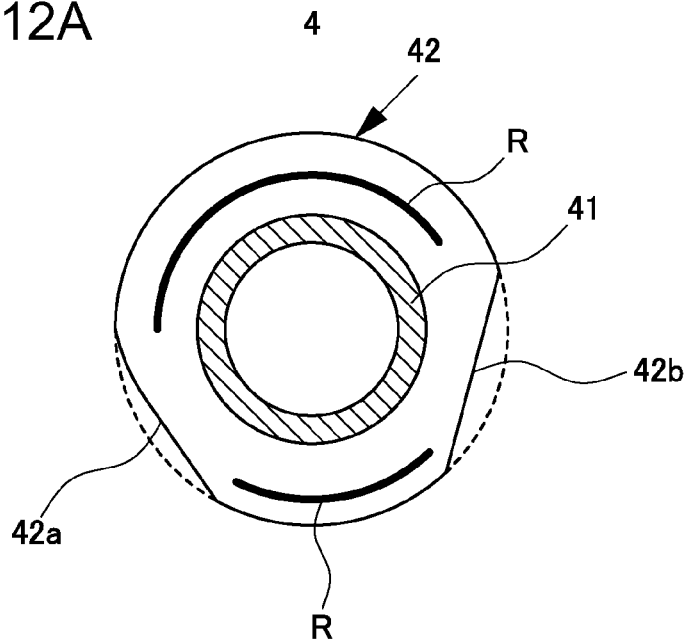
FIGS. 12A, 12B are explanatory side and end views showing a welding position of the front link member and the link connecting member according to one embodiment of the present invention.
Figure 12B:
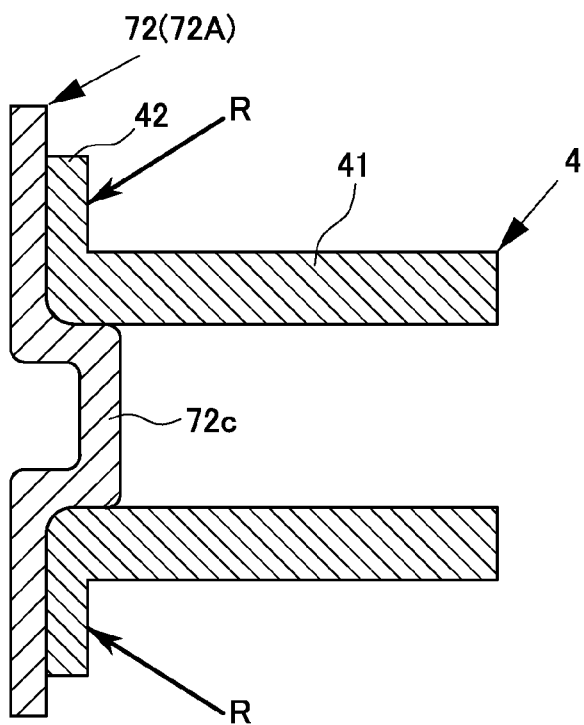

As shown in FIGS. 12A-12B, welding is performed on the welding points R portion.

That is to say, welding is performed in the position except for the positions of the first notch 42a and the second notch 42b.

Figure 13:
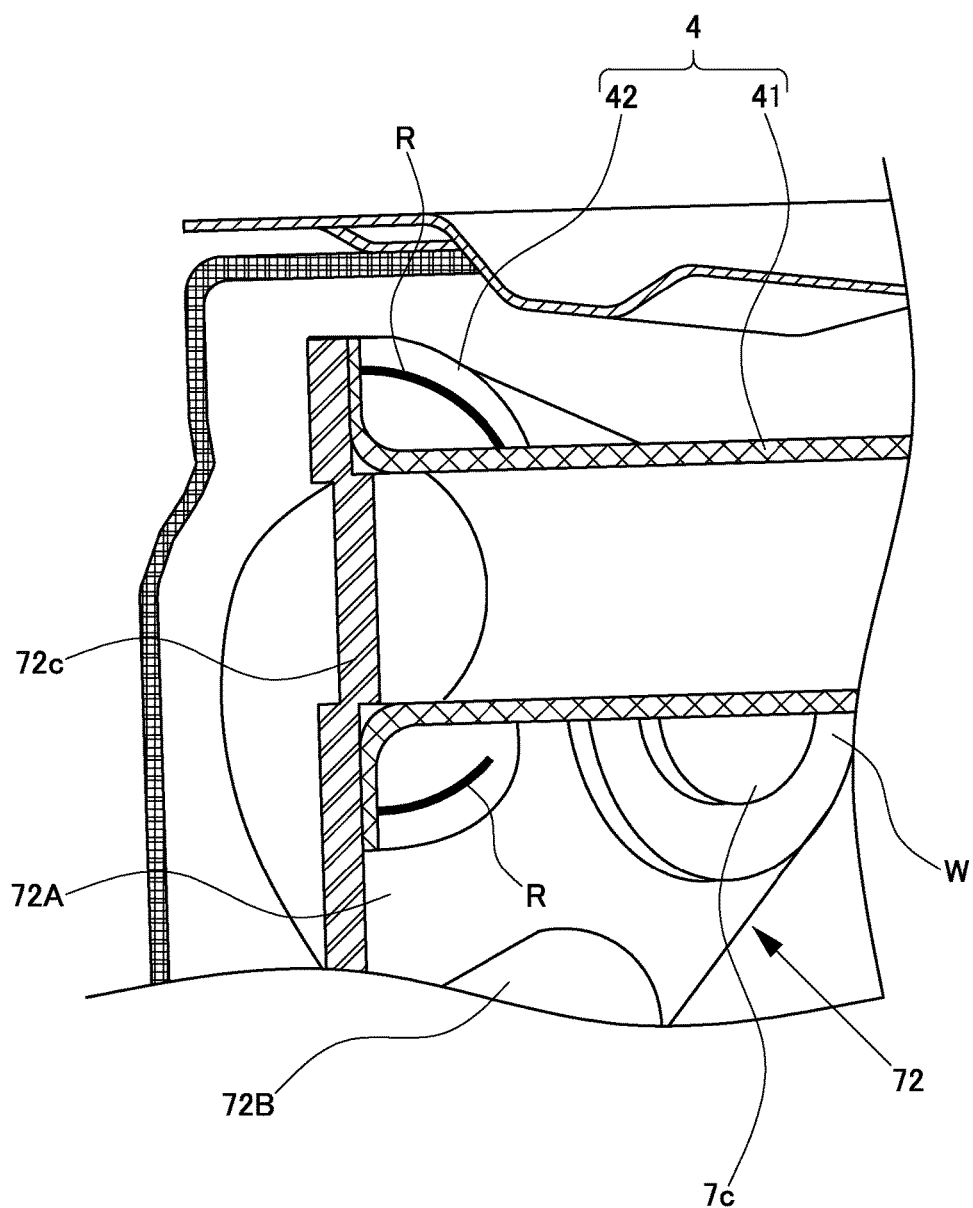
FIG. 13 is an explanatory perspective view showing a state after welding the front link member and the link connecting member according to one embodiment of the present invention.

FIG. 13 shows a welded state.

In this way, the flange portions 42 formed on the end portions of the front connecting member 4 are joined to the body portion 72A constituting the driven side link member 72.

Returning to FIG. 10, next, the link mechanism L is connected to the brackets 15, in Step 4.

This step is performed by inserting the fourth link shaft 7d in the communication hole between the front insertion holes 52a, 52a formed in the front link mounting portions 52, 52 of the mounting brackets 15, 15 and the driven side first hole 72a formed in the driven side link member 72 and rotatably supporting it, and by inserting the second link shaft 7b in the communication hole between the rear insertion holes 53a, 53a formed in the rear link mounting portions 53, 53 of the mounting brackets 15, 15 and the driving side first hole 71a formed in the driving side link member 71 and rotatably supporting it.

In this way, in the step of forming the flange portions 42 in the present embodiment, the flange portions 42 are formed by pressing the end portions of the front connecting member 4 having the end portions widening in a tapered shape to the driven side link members 72 side against the facing surfaces of the driven side link members 72 facing the end portions, and flexibly deforming the end portions to be parallel to the facing surface, and in the next step, the end surfaces of the distorted and deformed flange portions 42 and the facing surfaces of the driven side link members 72 are welded.

Therefore, the end surfaces of the flange portions 42 and the facing surfaces of the driven side link members 72 can be abutted, thereby increasing joint rigidity.

That is to say, the rising angle of the flange portion 42 is adjusted while being pressed to the facing surface of the driven side link member 72 so that an error of the facing surface of the driven side link member 72 can be absorbed.

Since the driven side link member 72 is a molded product and is not a precision portion, an error of an extent that is not an obstacle to the function is generated in the individual flatness, angle and the like, and also in mounting, an error is generated in the mounting angle.

Therefore, if the flange portion whose rising angle is raised at a constant angle (perpendicular to the outer peripheral surface of the pipe) from the first is used, errors of the individual driven side link members 72 cannot be absorbed.

However, in the present embodiment, the rising angle of the flange portion 42 is adjusted while being pressed to the facing surface of the driven side link member 72, so that an error of the facing surface of the driven side link member 72 is absorbed, and welding can be performed in a state that a clearance is reduced, thereby improving joint rigidity.

The clearance can be suppressed to 0.1 mm or less.

In the above embodiment, the vehicle seat S has been described as an example of seats, but the present invention is not limited thereto and can be applied to seats for other vehicles such as aircrafts and ships. Further, the present invention is not limited to seats for vehicles, but can be applied to seats requiring load measurement.

REFERENCE NUMERALS

F Seat frame
  1 Seat back frame
  2 Seating frame
  2a Side frame
    21a First link shaft through-hole
    21b Second link shaft through-hole
  6 S spring
  7 Height adjustment mechanism
  15 Mounting bracket (Support base)
  50 Bottom wall portion
  52 Front link mounting portion
  52a Front insertion hole
  53 Rear link mounting portion
  53a Rear insertion hole
L Link mechanism
  L1 Driving side link mechanism
  3 Rear connecting member
  71 Driving side link member
    71a Driving side first hole
    71b Driving side second hole
    71c Driving side third hole
    7a First link shaft
    7b Second link shaft
  L2 Driven side link mechanism
  4 Front connecting member (Link connecting member)
    41 Pipe portion
    42 Flange portion
      42a First notch
      42b Second notch
  72 Driven side link member
    72A Body portion
      72b Driven side second hole
      72c Engaging projection
    72B Stepped portion
      72a Driven side first hole
      72d Restriction portion
    W Washer
  7c Third link shaft
  7d Fourth link shaft
  R Welding point
  10 Rail mechanism
  11 Lower rail
  12 Upper rail
  17 Slide lever
S Vehicle seat
  S1 Seat back
  S2 Seating portion
  S3 Head rest
  S1a, S2a, S3a Cushion pad
  S1b, S2b, S3b Skin material
  19 Head rest pillar

The invention claimed is:

1. A vehicle seat, comprising:
a link mechanism for liftably connecting a seat cushion to a support base directly or indirectly mounted to a vehicle body,
wherein:
the seat cushion is composed of a seating frame with side frames arranged at both right and left ends;
the link mechanism comprises link members connecting the support base and the side frames, and a link connecting member connecting the link members together;
flange portions are formed at both end portions of an extending direction of the link connecting member;
end surfaces of the extending direction of the flange portions and facing surfaces of the link members facing the end surfaces are abutted;
the end surfaces and the facing surfaces are joined by welding; and
the flange portion has a notch formed by notching at least a portion of an outer edge portion thereof.

2. The vehicle seat according to claim 1, wherein an outer edge at a position matched to a corner of the facing surface of the link member, of the end surface of the flange portion, is notched into a shape along the outer edge of the corner.

3. The vehicle seat according to claim 1, wherein
the link connecting member is configured to have a hollow bore extending to the end surfaces of the flange portions,
the facing surfaces of the link members are configured to have engaging projections projecting towards the flange portions, and
the hollow bore and the engaging projections are matched.

4. The vehicle seat according to claim 1, wherein the end surfaces and the facing surfaces are joined by laser-welding.

5. The vehicle seat according to claim 4, wherein the laser-welding is performed at a position where the notch is not formed.

6. A vehicle seat, comprising:
a link mechanism for liftably connecting a seat cushion to a support base directly or indirectly mounted to a vehicle body,
wherein:
the seat cushion is composed of a seating frame with side frames arranged at both right and left ends;
the link mechanism comprises link members connecting the support base and the side frames, and a link connecting member connecting the link members together;
flange portions are formed at both end portions of an extending direction of the link connecting member;
end surfaces of the extending direction of the flange portions and facing surfaces of the link members facing the end surfaces are abutted;
the end surfaces and the facing surfaces are joined by welding; and
an outer edge at a position matched to a corner of the facing surface of the link member, of the end surface of the flange portion, is notched into a shape along the outer edge of the corner.

7. The vehicle seat according to claim 6, wherein
the link connecting member is configured to have a hollow bore extending to the end surfaces of the flange portions,
the facing surfaces of the link members are configured to have engaging projections projecting towards the flange portions, and
the hollow bore and the engaging projections are matched.

8. The vehicle seat according to claim 6, wherein the end surfaces and the facing surfaces are joined by laser-welding.

9. The vehicle seat according to claim 8, wherein the laser-welding is performed at a position where the notch is not formed.

10. A vehicle seat, comprising:
a link mechanism for liftably connecting a seat cushion to a support base directly or indirectly mounted to a vehicle body,
wherein:
the seat cushion is composed of a seating frame with side frames arranged at both right and left ends;
the link mechanism comprises link members connecting the support base and the side frames, and a link connecting member connecting the link members together;
flange portions are formed at both end portions of an extending direction of the link connecting member;
end surfaces of the extending direction of the flange portions and facing surfaces of the link members facing the end surfaces are abutted;
the end surfaces and the facing surfaces are joined by welding;
the link connecting member is configured to have a hollow bore extending to the end surfaces of the flange portions;
the facing surfaces of the link members are configured to have engaging projections projecting towards the flange portions; and
the hollow bore and the engaging projections are matched.

11. The vehicle seat according to claim 10, wherein the end surfaces and the facing surfaces are joined by laser-welding.

12. The vehicle seat according to claim 11, wherein the laser-welding is performed at a position where the notch is not formed.

* * * * *